United States Patent
Paulussen et al.

(10) Patent No.: US 8,379,181 B2
(45) Date of Patent: Feb. 19, 2013

(54) LCD PANEL TO BACKLIGHT FIXATION

(75) Inventors: Marco Paulussen, Maastricht (NL); Ralph Amory, Lanaken (BE)

(73) Assignee: Chimei Innolux Corporation, Chu-Nan (TW)

( * ) Notice: Subject to any disclaimer, the term of this patent is extended or adjusted under 35 U.S.C. 154(b) by 696 days.

(21) Appl. No.: 12/540,310

(22) Filed: Aug. 12, 2009

(65) Prior Publication Data

US 2010/0039582 A1 Feb. 18, 2010

(30) Foreign Application Priority Data

Aug. 13, 2008 (EP) .................................... 08162284

(51) Int. Cl.
*G02F 1/1333* (2006.01)
*G02F 1/1335* (2006.01)
*H01J 9/24* (2006.01)
*G05G 15/00* (2006.01)

(52) U.S. Cl. ............. 349/161; 349/61; 445/24; 156/359

(58) Field of Classification Search .................. 349/161, 349/61; 445/24; 156/359
See application file for complete search history.

(56) References Cited

U.S. PATENT DOCUMENTS

| 2001/0028419 | A1 | 10/2001 | Fukiharu |
| 2006/0171164 | A1* | 8/2006 | Kida ............................ 362/608 |

FOREIGN PATENT DOCUMENTS

| EP | 1791017 | 5/2007 |
| JP | 7-159779 | 6/1995 |
| JP | 07159779 A * | 6/1995 |
| JP | 2007-078912 | 3/2007 |
| JP | 2007078912 A * | 3/2007 |
| JP | 2007-140471 | 6/2007 |
| TW | 200604622 | 2/2006 |
| TW | 200815793 | 4/2008 |

* cited by examiner

*Primary Examiner* — Mike Qi
(74) *Attorney, Agent, or Firm* — Liu & Liu (57) ABSTRACT

The present invention provides a method of manufacturing a display module, the display module comprising a display panel and a backlight, The method includes the following steps: placing the display panel and the backlight into contact on a common contact area, the common contact area being defined as a fixation region of a contacting surface of the display panel coinciding with a contacting surface of the backlight, and applying a heat flow in the common contact area to create a local weld connection in the common contact area between the display panel and the backlight.

21 Claims, 7 Drawing Sheets

LCD PANEL TO BACKLIGHT FIXATION

CROSS REFERENCE TO RELATED APPLICATIONS

This application claims the right of priority based on European Patent Application No. 08162284.7 entitled "Improved LCD Panel to Backlight Fixation", filed on Aug. 13, 2008, which is incorporated herein by reference and assigned to the assignee herein.

FIELD OF INVENTION

The present invention relates to a method for manufacturing a display device. Also the invention relates to a display device.

BACKGROUND OF THE INVENTION

LCD display modules comprise a display panel and a backlight, in which a side of the display panel is attached to a light-emitting side of the backlight. The display panel comprises a plurality of pixel elements, usually arranged in a matrix formation, wherein each pixel element may be controlled individually to be in a transparent state or an opaque state. By selectively controlling each pixel, an (moving) image may be created. The backlight is arranged for producing light that is allowed to pass through the transparent pixels of the display panel and is blocked by the opaque pixels to create an illuminated image on the side of the display panel not attached to the backlight.

In such modules for LCD display from the prior art the display panel is attached to the backlight by a double sided adhesive (DSA or rim sheet). The rim sheet is attached on one side to a circumferential area on the side of the display panel and on the other side to a corresponding circumferential area on the side of the backlight. Typically the rim sheet is shaped as a frame coinciding with the outer edges of the display panel or backlight. The shape of the frame is for example rectangular. The circumferential areas of the display panel and the backlight have no further purpose than to provide on one part (the display panel) a surface for fixation to the other part (the backlight).

A variety of electronic devices comprise a display module. Such electronic devices may be telecommunication devices such as smartphones, PDA's, gaming devices, audio/video player devices, etc. However, in the design of electronic devices that comprise a display module a trend is observed that the so-called Gakabuchi's of panels, i.e., the circumferential area of the panel is getting smaller and smaller. This is driven by the desire for smaller and thinner electronic devices, while at the same time the relative area for the display within the electronic device increases.

The reduction of thickness and of available circumferential area has an adverse effect on the fixation of LCD panel and backlight. Due to the desired reduction of the thickness of the LCD module, also a reduction of the thickness of the rim sheet will be required. Moreover, since the circumferential area is to be reduced, the width of the rim sheet also needs to be reduced. The reduction of thickness and width of the rim sheet causes a reduction of adhesion strength of the rim sheet.

As a result of the reduction of adhesion strength a display panel may become detached from the backlight before assembly into an electronic device.

A further problem is that no adequate tool is available for cutting or punching such narrow-width and thin rim sheet frame as demanded by modern designs as described above.

SUMMARY OF THE INVENTION

An embodiment of the present invention provides a method of manufacturing a display module, the display module comprises a display panel and a backlight. The method comprises:

placing the display panel and the backlight into contact on a common contact area, the common contact area being defined as a fixation region of a contacting surface of the display panel coinciding with a contacting surface of the backlight, and applying a heat flow in the common contact area to create a local weld connection in the common contact area between the display panel and the backlight.

Advantageously, the method provides that the display panel and the backlight are attached in a fixed connection while at the same time the circumferential area can be smaller. Also, the method provides that the fixed connection is robust which reduces the risk of the display panel popping out of the backlight before assembly in an electronic device.

In another embodiment, the heat flow is applied by placing an embedded heater between the display panel and the backlight. The heater can be any device which can bring thermal energy. One example of the heater could be an embedded tube containing fluid of high temperature.

Also, an embodiment of the present invention relates to a display module comprising a display panel and a backlight, wherein the display panel and the backlight are placed into contact on a common contact area, the common contact area being defined as a fixation region of a contacting surface of the display panel coinciding with a contacting surface of the backlight, and a local weld connection is provided in the common contact area between the display panel and the backlight.

Moreover, an embodiment of the present invention relates to an electronic device comprising a display module manufactured as described above.

The foregoing and other features of the invention will be apparent from the following more particular description of embodiments of the invention.

BRIEF DESCRIPTION OF THE DRAWINGS

The present invention is illustrated by way of example and not intended to be limited by the figures of the accompanying drawings, in which like notations indicate similar elements.

DETAILED DESCRIPTION

Figure 1:
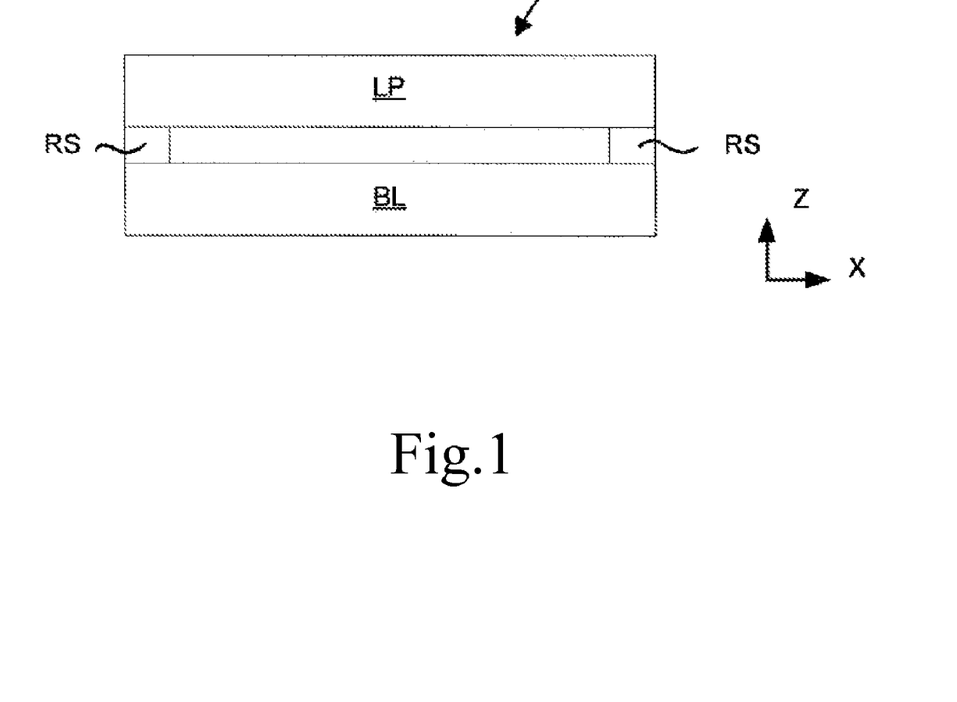
FIG. 1 schematically shows a cross-sectional view of a display module from the prior art.

FIG. 1 schematically shows a cross-sectional view of a display module from the prior art. The display module 1 from the prior art comprises a display panel LP and a backlight BL. The display panel LP is attached to a light-emitting side of the backlight BL.

The display panel LP comprises a plurality of pixel elements, usually arranged in a matrix formation, wherein each pixel element may be controlled individually to be in a transparent state or an opaque state. The backlight BL is arranged for producing light that is allowed to pass through the transparent pixels of the display panel and is blocked by the opaque pixels to create an illuminated image on the side of the display panel not attached to the backlight. The illuminated image is created by selectively controlling the state of transparency of each individual pixel.

The display panel LP is attached to the backlight BL by a double sided adhesive (DSA) or rim sheet RS. The rim sheet RS is attached on one side to a circumferential area on the side of the display panel LP and on the other side to a corresponding circumferential area on the side of the backlight BL. Typically, the rim sheet is shaped as a frame coinciding with the outer edges of the display panel or backlight.

Figure 2:
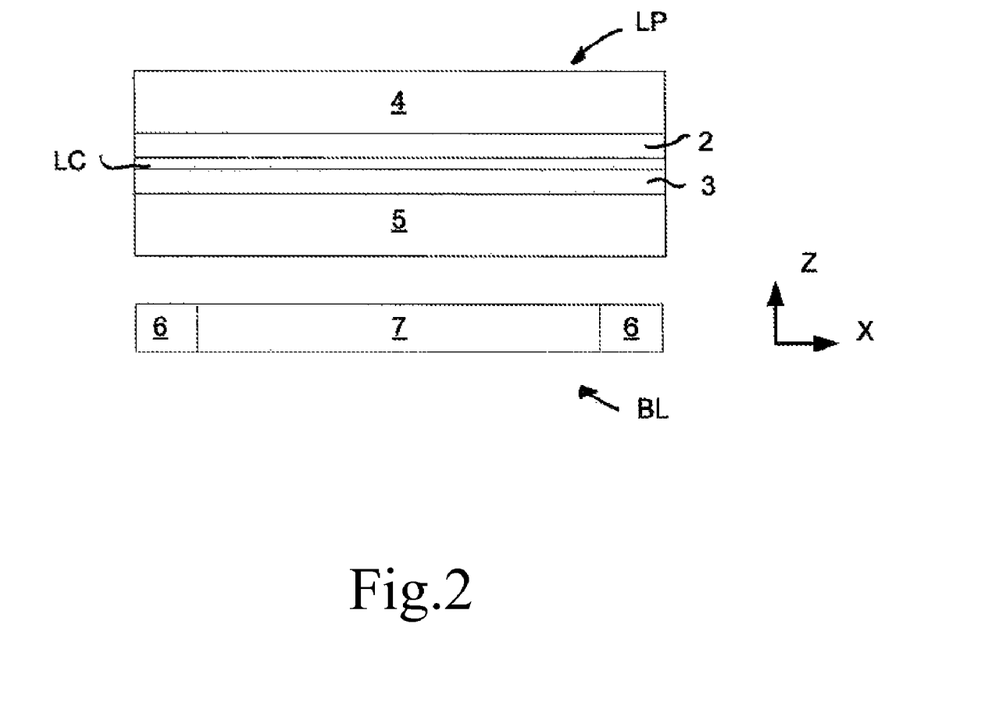
FIG. 2 schematically shows a cross-sectional view of a display panel and a backlight before fixation in accordance with an embodiment.

FIG. 2 schematically shows a cross-sectional view of a display panel and a backlight before fixation in accordance with an embodiment.

The display panel LP which is shown in more detail than in FIG. 1, is a layered structure which comprises a first substrate 2 and a second substrate 3 which are attached to each other at a surface. The first substrate 2 and the second substrate 3 could be transparent materials such as glass plates. The liquid crystal pixel arrangement indicated as layer LC is located in between the first and second substrates.

The structure and layout of the liquid crystal pixel arrangement LC are known to the skilled in the art and will not be discussed here in detail.

Further the display panel LP comprises a first polarizer 4 and a second polarizer 5.

On its free surface (directed away from the LC layer) the first substrate 2 is covered by the first polarizer 4.

The second substrate 3 is covered on its free surface (directed away from the LC layer) by the second polarizer 5.

The second polarizer 5 which is designated as a back-polarizer is directed towards the backlight BL.

The backlight BL comprises a framework 6 and a light guide 7. The framework 6 surrounds and holds the light guide 7. In use, the light guide 7 is arranged for guiding light from a light source (not shown) in a direction perpendicular to the surface of the light guide.

Similar as shown in FIG. 1, the display panel LP and the backlight BL need to be fixed to each other. Typically, the fixation will be done at the circumferential area which overlaps with the region of the framework 6.

Figure 3A:
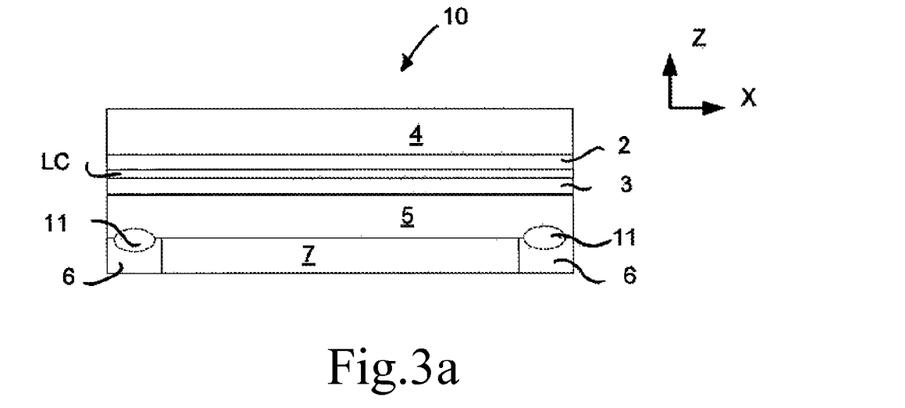
FIG. 3a schematically shows a cross-sectional view of a display panel and a backlight after fixation in accordance with an embodiment.

FIG. 3a schematically shows a cross-sectional view of a display panel and a backlight after fixation in accordance with an embodiment. The cross-sectional view of FIG. 3a is oriented along an XZ plane, wherein X is the horizontal direction and Z is the vertical direction.

The surface of the second polarizer 5 of the display panel LP and the framework 6 of the backlight BL are fixed to each other and form the display module 10.

According to the invention, the fixation of the display panel LP and the backlight BL is achieved in fixation regions 11 by a welding technique. The method of fixating the display panel LP and the backlight BL comprises that first the display panel LP and the backlight BL are placed in contact with each other to form an assembly, in such a way that the display panel LP is aligned with the backlight BL. The method comprises that next a local heating is applied by a heat flow at fixation regions 11 which are located on at least a portion of the circumferential area of the assembly.

The surfaces of the display panel LP and the backlight BL weld together in the fixation regions 11, if a first material of the second polarizer 5 of the display panel LP and a second material of the framework 6 of the backlight BL that are to be fixed to each other, are in a physical and/or chemical sense compatible. If both the first and second materials are thermoplastic materials, the materials will be compatible and allow welding.

If the first and second materials in the fixation regions are incompatible, "direct" welding may not be feasible, for example if the first material is a thermohardener while the second material is a thermoplastic.

Figure 3B:
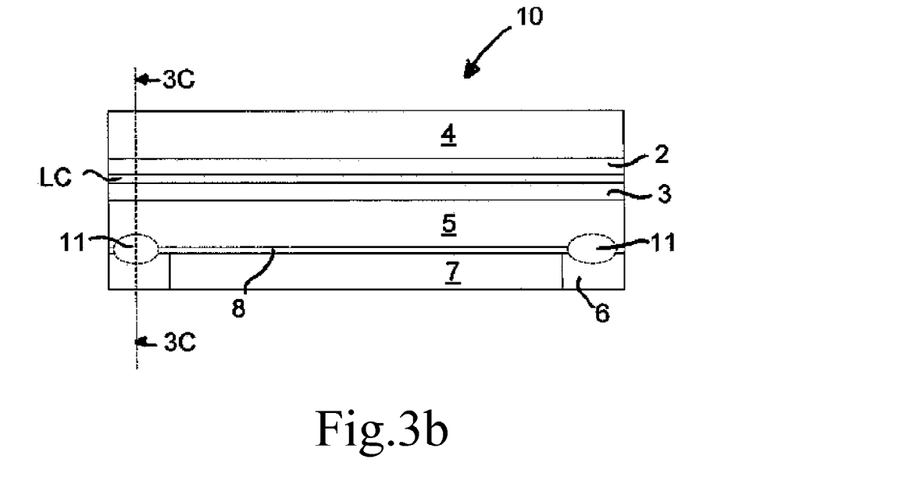
FIG. 3b schematically shows a cross-sectional view of a display panel and a backlight after fixation in accordance with a further embodiment.

FIG. 3b schematically shows a cross-sectional view of a display panel and a backlight after fixation in accordance with a further embodiment. In this embodiment, the method comprises an action to cover the surface of the display panel LP with a layer of a thermoplastic material 8 that is compatible with the second material of the surface of the framework 6 of the backlight BL. For example, such a layer of thermoplastic material 8 may be glued on the surface of the display panel LP, but the glue for the thermoplastic material 8 should provide enough adhesion strength.

For example, the surface of the display panel LP consists of the second polarizer 5 which is typically formed from a thermohardener (e.g., poly-acetate-cellulose), while the fixation region of the backlight BL is the framework 6 which consists of a thermoplastic (e.g., poly-carbonate). In this embodiment, the surface of the display panel LP and the framework 6 are not welded directly together, but the layer of a thermoplastic material 8, glued on the surface of the display panel LP, and the framework 6 are welded together.

In an embodiment, the layer 8 of thermoplastic material comprises poly-carbonate.

In a further embodiment, during local heating a pressure is applied on the surfaces of the display panel and backlight to obtain proper fixation.

The local heating allows that the display panel and the backlight are attached in a fixed connection while at the same time the circumferential area can be smaller. Also, the method provides that the fixed connection is robust which reduces the risk of the display panel popping out of the backlight before assembly in an electronic device.

Figure 3C:
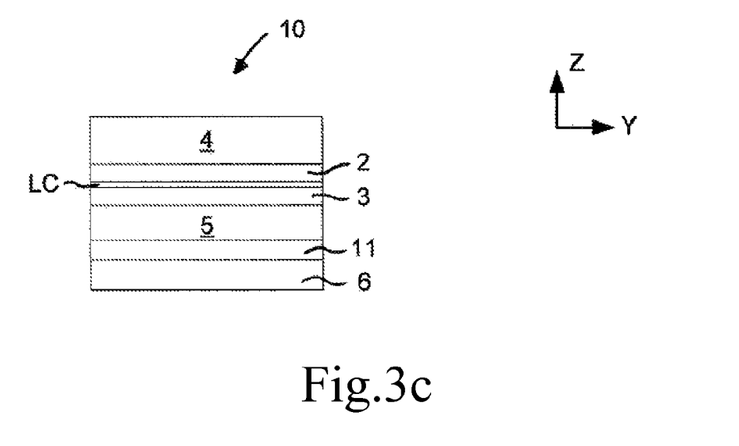
FIG. 3c schematically shows a further cross-sectional view of a display panel and a backlight after fixation in accordance with the embodiment of FIG. 3b.

FIG. 3c shows a second cross-sectional view along the YZ plane which is taken along the line 3c-3c of FIG. 3b. The Y-direction is the second horizontal direction orthogonal to the X and Z directions.

In this embodiment, the fixation region 11 is line shaped and extends along the Y-direction.

In an embodiment, the local heating is provided by an embedded heating element, for example a resistive wire, which can be heated by directing a current passing through the wire.

In another embodiment, the local heating is provided by an external heating source that can controllably transfer heat to the fixation regions 11 in the display module 10. Such an external heating source may be a laser source or an ultrasonic energy transducer.

Figure 4A:
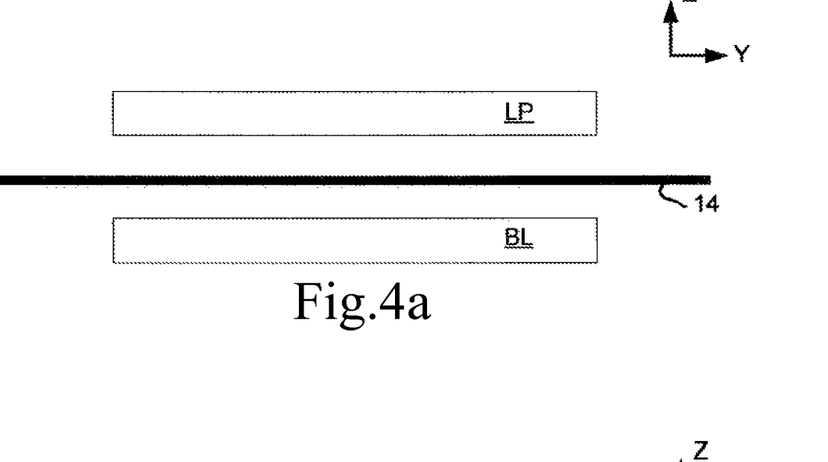
FIGS. 4a-4c schematically show a method of fixation of a display panel and a backlight in accordance with an embodiment.
Figure 4B:
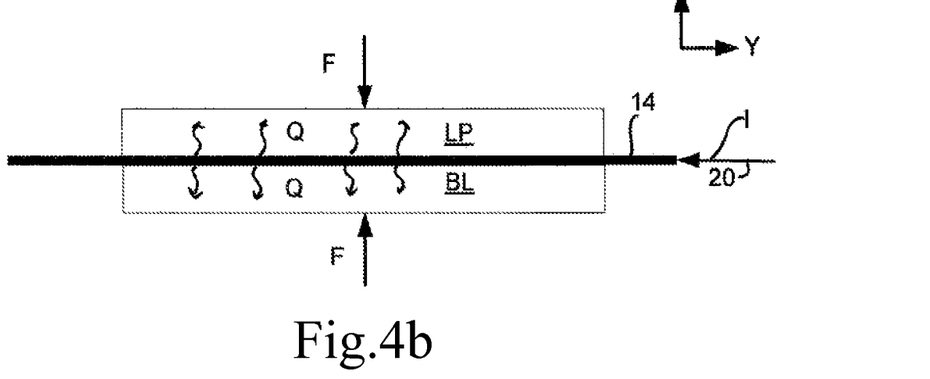
Figure 4C:
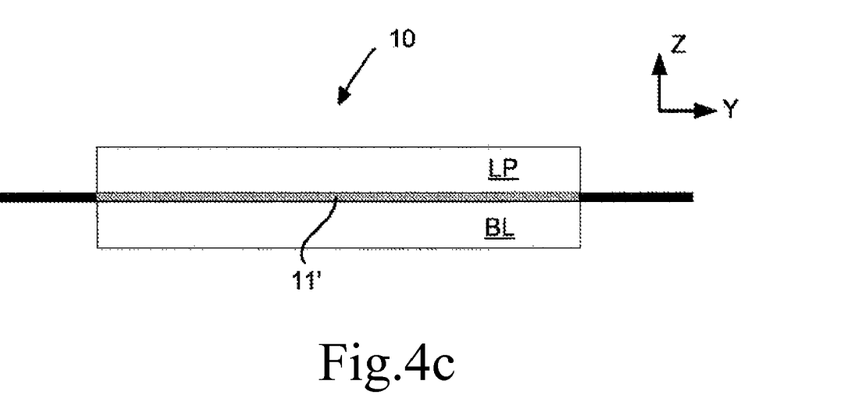

FIGS. 4a-4c schematically show a method of fixation of a display panel and a backlight in accordance with an embodiment.

In FIG. 4a the display panel LP and the backlight BL are shown separately with a resistive wire 14 arranged in between. The wire extends parallel along the edge of the surfaces of the display panel LP and the backlight BL that need to be attached.

In FIG. 4b the display panel LP and the backlight BL are brought in contact under some pressure F. During the contact under pressure a current I is passed through the wire 14, to produce resistive heat Q (indicated by wiggled lines) along the wire to weld the surface of the display panel LP and the surface of the backlight together and form a display module 10.

FIG. 4c shows a cross-sectional view of the display module 10. Due to the heating under pressure the surface of the display panel LP and the surface of the backlight BL have welded together and to form a weld zone 11' for fixation of the display panel LP to the backlight BL. The resistive wire 14 is embedded in the weld zone. Any portion of the wire extending from the display module 10 can be removed, for example by cutting the wire.

Figure 5A:
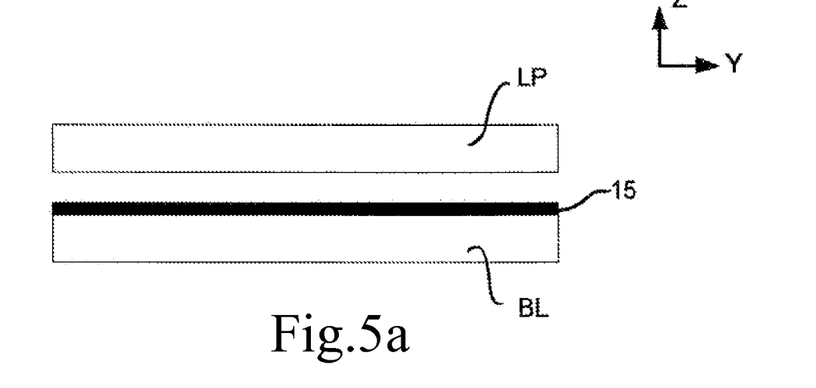
FIGS. 5a-5c schematically show a method of fixation of a display panel and a backlight in accordance with an embodiment.
Figure 5B:
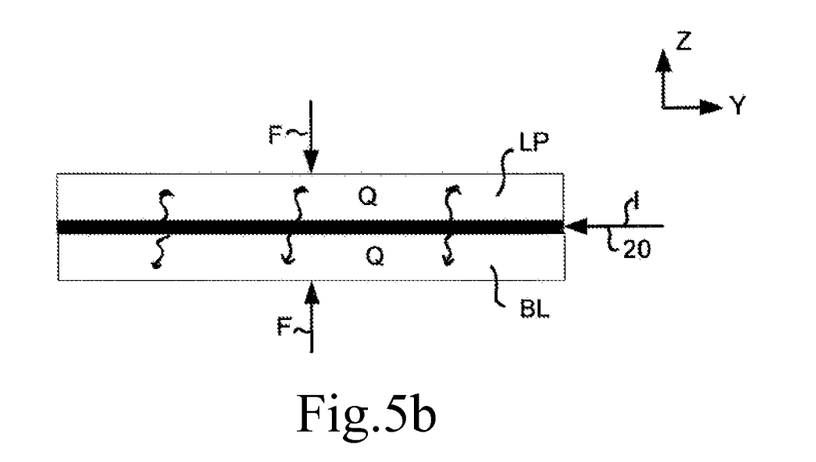
Figure 5C:
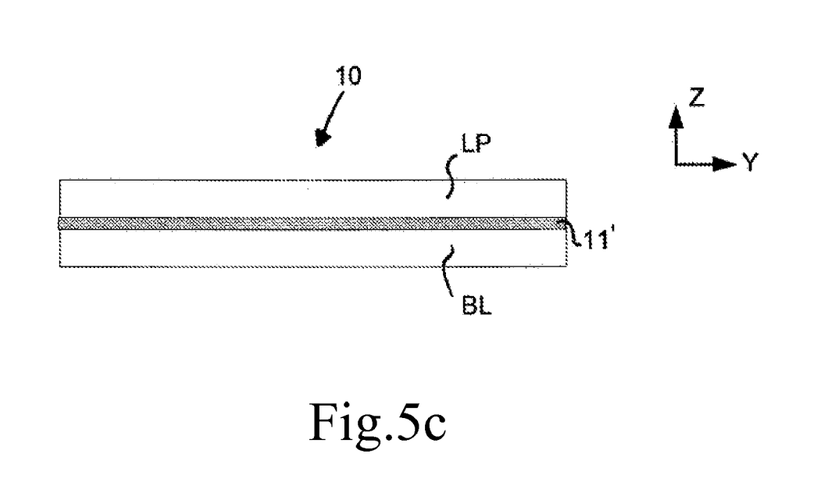

FIGS. 5a-5c schematically show a method of fixation of a display panel and a backlight in accordance with an embodiment.

In FIG. 5a the display panel LP and the backlight BL are shown separately with a resistive wire 15 being arranged on the surface of the backlight BL. In this embodiment, the wire 15 is deposited on the surface of the backlight BL. The wire 15 extends along the edge of the backlight BL. The wire 15 consists of a resistive material and may comprise a metal, a metal-silicide or a conductive oxide. The wire 15 is manufactured by depositing a conductive material on the contacting surface of the backlight BL and patterning the conductive material into a wire-shaped line.

In an embodiment, the conductive material could be a transparent material or the conductive oxide can be a transparent conductive oxide, such as indium-tin-oxide (ITO).

In FIG. 5b the display panel LP and the backlight BL are brought in contact under some pressure F. During the contact under pressure, connections 20 are made to the wire 15 so as to pass a current I through the wire 15, to produce resistive heat Q along the wire 15 to weld the surface of the display panel LP and the surface of the backlight together and to form a display module 10.

FIG. 5c shows a cross-sectional view of the display module 10. Due to the heating under pressure the surface of the display panel LP and the surface of the backlight BL have welded together and form a weld zone 11' for fixation of the display panel LP to the backlight BL. The deposited wire 15 is embedded in the weld zone. The connections 20 to the wire 15 are removed.

Figure 6A:
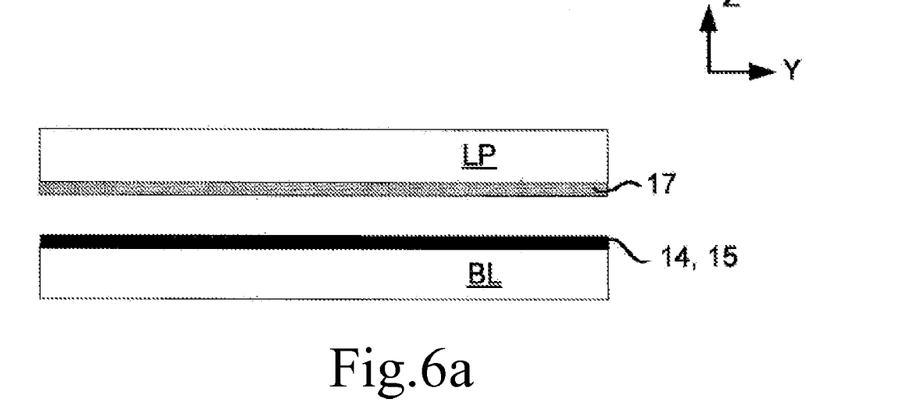
FIGS. 6a-6c schematically show a method of fixation of a display panel and a backlight in accordance with an embodiment.
Figure 6B:
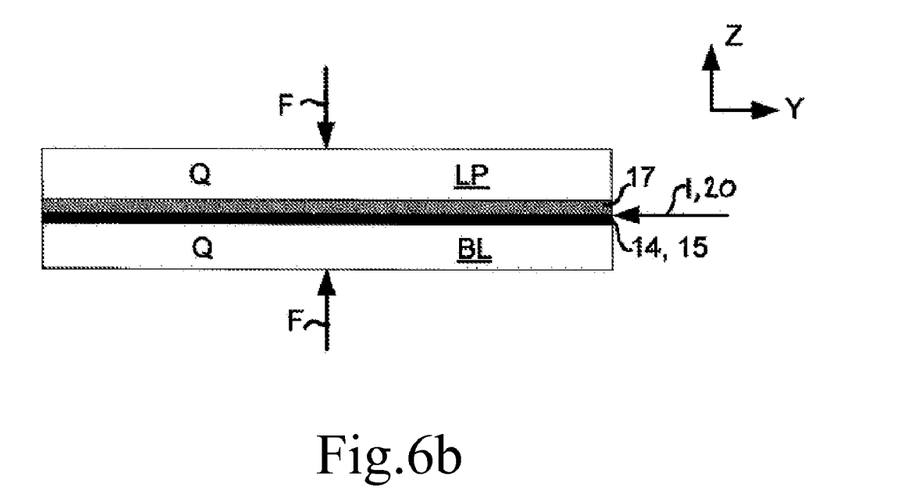
Figure 6C:
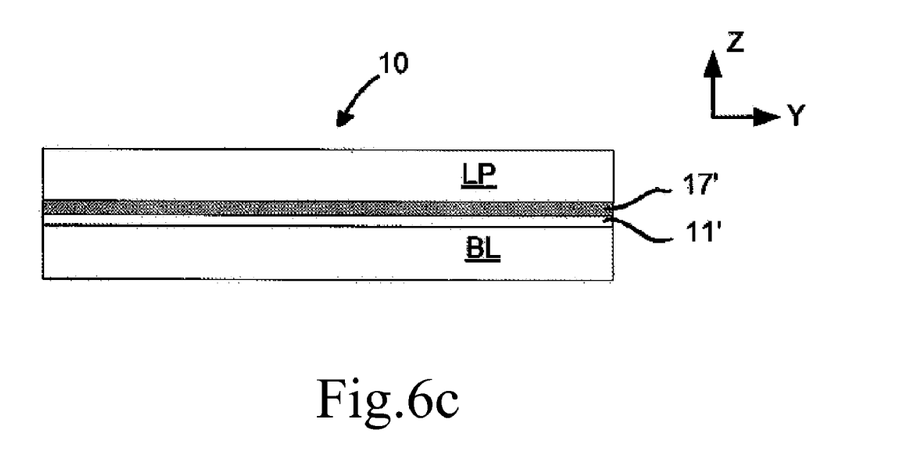

FIGS. 6a-6c schematically show a method of fixation of a display panel and a backlight in accordance with an embodiment.

In FIG. 6a the display panel LP and the backlight BL are shown separately with a resistive wire 14; 15 as shown in FIGS. 4a-4c or 5a-5c being arranged on the surface of the backlight panel BL. In FIG. 6, the wire is shown as a deposited wire on the surface of the backlight panel BL, but alternatively the wire may be a separate resistive wire. The wire 14; 15 extends along the edge of the backlight BL. The wire 14; 15 consists of a resistive material and may comprise a metal, a metal-silicide or a conductive oxide, such as indium-tin-oxide (ITO).

On the surface of the display panel LP a layer of thermoplastic material 17 is attached, for example glued to the surface of the display panel LP.

In this embodiment, the surface of the backlight BL consists of a thermoplastic material.

In FIG. 6b, the display panel LP and the backlight BL are brought in contact under some pressure F. During the contact under pressure, connections 20 are made to the wire so as to pass a current I through the wire, to produce resistive heat Q along the wire to combine the surface of the display panel LP (the thermohardening material) with the surface of the backlight BL (the thermoplastic material) together and to form a display module. The welding is assisted by the presence of the layer of thermoplastic material 17. Due to the use of compatible materials adhered to the panel LP, welding to the backlight BL can be accomplished.

FIG. 6c shows a cross-sectional view of the display module. Due to the heating under pressure the surface of the display panel LP and the surface of the backlight BL have welded together and form a weld zone 11', 17' for fixation of the display panel LP to the backlight BL. The wire is embedded in the weld zone.

Figure 7:
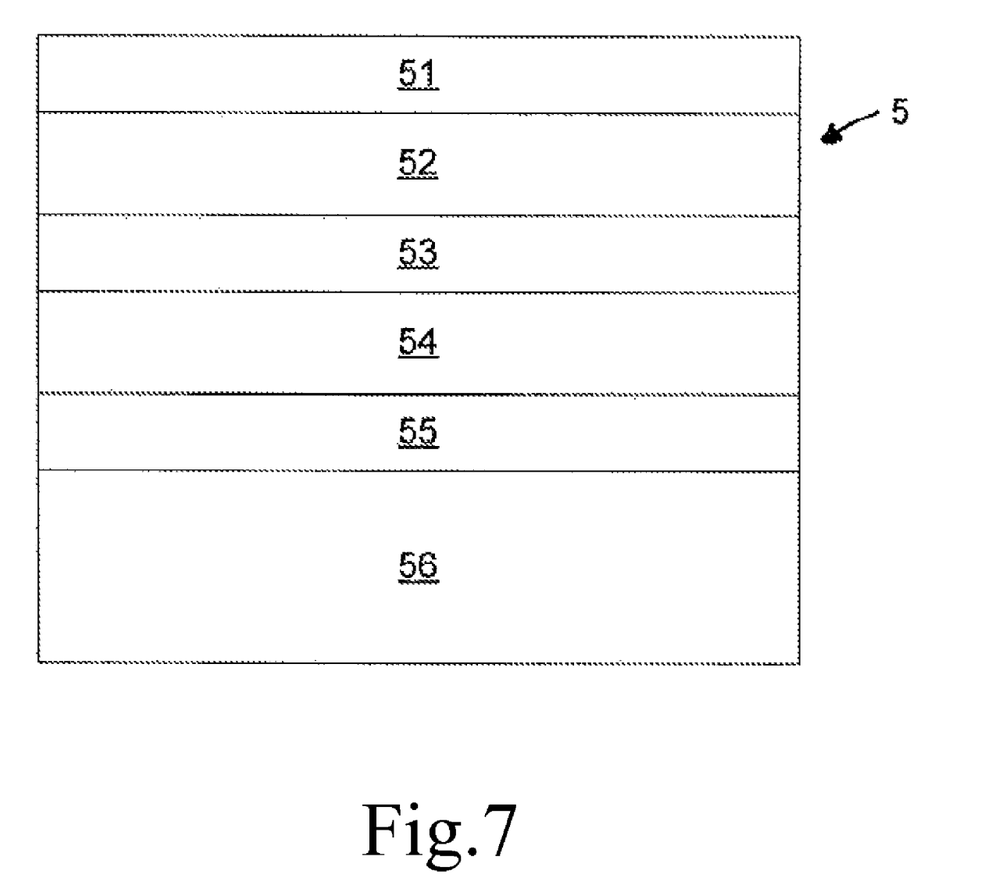
FIG. 7 schematically shows a cross-sectional view of a back-polarizer.

FIG. 7 schematically shows a cross-sectional view of a back-polarizer. A back-polarizer 5 (or second polarizer 5 as shown in FIGS. 2 and 3a-3c) of a display panel LP comprises a layer stack that during use controls the polarization of light that is emitted by the backlight BL into the display panel LP.

In an exemplary embodiment, the back-polarizer 5 comprises a first adhesive layer 51, a first polarizing layer 52, a second polarizing layer 53, and a third polarizing layer 54. The first, second and third polarizing layers 52, 53, 54 form a stack that functions as a polarizing element.

The first adhesive layer 51 is arranged for providing adhesion of the polarizing element 52, 53, 54 to the second substrate 3.

The polarizing element may consist of one or more layers of thermohardener material that are not weld-compatible with the thermoplastic material of the framework 6 of the backlight BL. For example, the first and third polarizing layer 52, 54 may consist of poly-acetate-cellulose, and the second polarizing layer may consist of poly-vinyl-acetate. For the reason that the surface layer 54 of the polarizing element is not weld-compatible with the material of the (framework 6 of the) backlight BL, a layer of thermoplastic material 56 may be provided on the back-polarizer surface layer 54. The layer of thermoplastic material 56 is attached to (the back-polarizer surface layer 54 of) the polarizing element by a second adhesive layer 55.

It is noted that the polarizing layers of the polarizing element may comprise other materials.

Figure 8A:
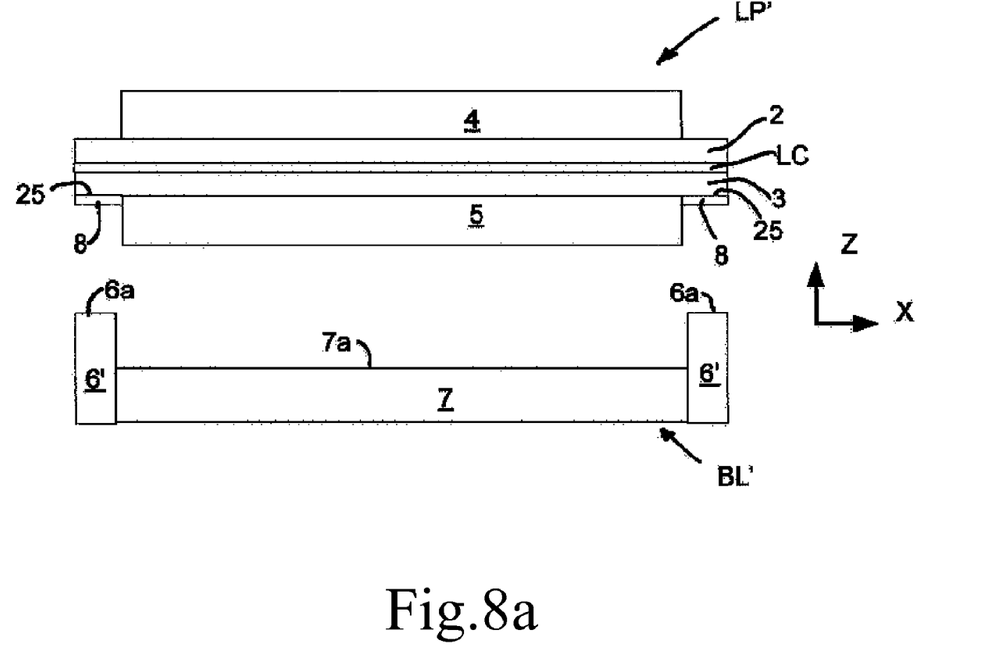
FIGS. 8a-8b schematically show a cross-sectional view of a display panel and a backlight before and after fixation in accordance with a further embodiment.
Figure 8B:
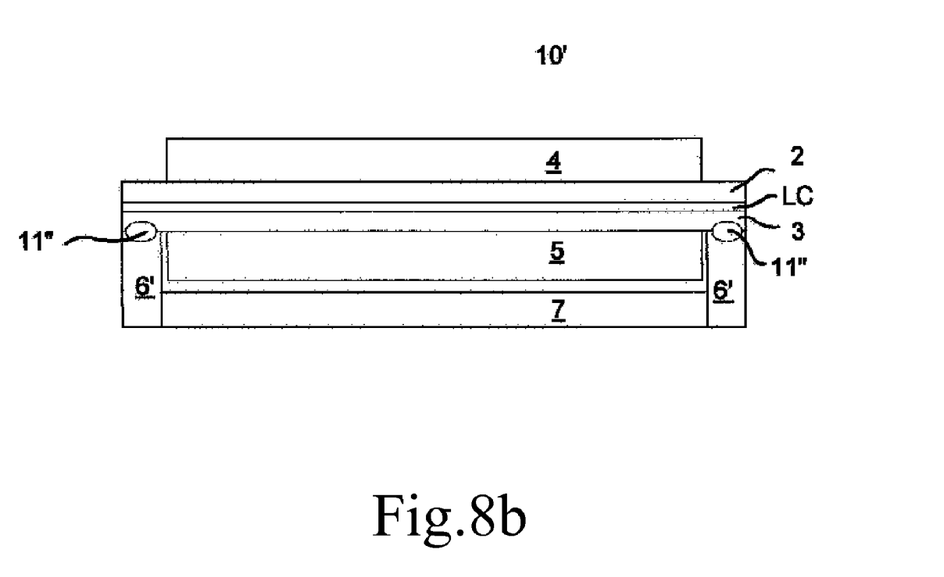

FIGS. 8a and 8b schematically show a cross-sectional view of a display panel and a backlight in accordance with a further embodiment, before and after fixation, respectively.

In FIGS. 8a, 8b entities with the same reference number as shown in the preceding figures refer to corresponding entities.

In this embodiment, the first and second polarizer 4, 5 of the display panel LP' cover only a portion of the respective first and second substrates 2, 3. Compared with the backlight BL mentioned above, the backlight BL' shown in FIGS. 8a, 8b is modified by arranging the light guide 7 to have a recess 7a, relative to an upper surface 6a of the framework 6'.

On the circumference of the second polarizer 5, an area 25 of the second substrate 3 is left open. The framework 6' of the backlight BL' is arranged to be attached to the open area 25 of the second substrate 3. In accordance with the invention, a layer of thermoplastic material 8 is attached to at least the open area 25 of the second substrate 3.

Next, the display panel LP' and the backlight BL' are positioned so as to create a contact area between the layer of thermoplastic material 8 attached to the open area 25 and the upper surface 6*a* of the framework 6'. Subsequently, the contact area is heated while some pressure is exerted to obtain a weld connection 11" between the display panel LP' and the backlight BL'.

In FIG. 8*b* a cross-section of the display module 10' is shown after welding. It is noted that the invention to manufacture a display module may be applied in circumstances where the framework 6' of the backlight device BL needs to be attached to any other weld-incompatible material being part of a display panel LP, such as a metal, semiconductor material, ceramic material, or organic material, if the layer of thermoplastic material can be attached (glued) to the weld-incompatible material.

While this invention has been described with reference to the illustrative embodiments, these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

The invention claimed is:

1. A method of manufacturing a display module, the display module comprising a display panel and a backlight, the method comprising:
    placing the display panel and the backlight into contact on a common contact area, the common contact area being defined as a fixation region of a contacting surface of the display panel coinciding with a contacting surface of the backlight; and
    applying a heat flow in the common contact area to create a local weld connection in the common contact area between the display panel and the backlight, wherein the heat flow is applied by placing an embedded heater between the contacting surface of the display panel and the contacting surface of the backlight.

2. A method according to claim 1, further comprising applying a pressure on the contacting surfaces during the application of the heat flow.

3. A method according to claim 2, wherein the heat flow is applied by placing a resistive wire between the contacting surface of the display panel and the contacting surface of the backlight and by passing an electric current through the resistive wire.

4. A method according to claim 3, wherein placing the resistive wire comprises depositing a conductive material on the contacting surface of the backlight and patterning the conductive material into a wire-shaped line.

5. A method according to claim 4, wherein the conductive material is a metal, a semiconductor material, a conductive oxide, or a transparent conductive oxide.

6. A method according to claim 1, wherein the backlight comprises a framework and a light guide, the framework surrounding and holding the light guide, and the contacting surface of the backlight comprises a surface portion of the framework.

7. A method according to claim 1, wherein the display panel further comprises a pixel layer, a substrate, and a back polarizer, the substrate being disposed between the pixel layer and the back polarizer, and the contacting surface of the display panel comprising a surface portion of the back polarizer.

8. A method according to claim 7, wherein the back polarizer exposes a surface portion of the substrate, and the contacting surface of the display panel comprises the surface portion of the back polarizer and the surface portion of the substrate.

9. A method according to claim 7, wherein the contacting surface of the backlight consists of a thermoplastic material and the contacting surface of the display panel consists of a material other than the thermoplastic and incompatible for welding to the thermoplastic, wherein the method further comprises attaching a layer of a thermoplastic material on the contacting surface of the display panel, preceding the placement of the display panel and the backlight into contact on the common contact area.

10. A method according to claim 9, wherein attaching the layer of the thermoplastic material on the contacting surface of the display panel comprises a provision of an adhesive layer between the layer of the thermoplastic material and the contacting surface of the display panel.

11. A method according to claim 1, wherein the embedded heater generates heat flow without relying on heat conduction from a source external of the display panel and backlight when they are placed into contact at the common contact area.

12. A LCD display module, comprising:
    a display panel;
    a backlight, wherein the display panel and the backlight are placed into contact on a common contact area, the common contact area being defined as a fixation region of a contacting surface of the display panel coinciding with a contacting surface of the backlight; a local weld connection provided in the common contact area between the display panel and the backlight, wherein the local weld connection is created by applying a heat flow in the common contact area; and
    an embedded heater, disposed between the display panel and the backlight, for generating the heat flow.

13. A LCD display module according to claim 12, further comprising:
    a resistive wire, disposed between the display panel and the backlight, for generating the heat flow when being given an electric current.

14. An electronic device comprising a LCD display module according to claim 12.

15. An electronic device according to claim 14, wherein said LCD display module further comprises:
    a resistive wire, disposed between the display panel and the backlight, for generating a heat flow when being given an electric current.

16. A method of manufacturing a display module, the display module comprising a display panel and a backlight, the method comprising:
    placing the display panel and the backlight into contact on a common contact area, the common contact area being defined as a fixation region of a contacting surface of the display panel coinciding with a contacting surface of the backlight, wherein the contacting surface of the backlight consists of a thermoplastic material and the contacting surface of the display panel consists of a material other than the thermoplastic and incompatible for welding to the thermoplastic, wherein the method further comprises attaching a layer of a thermoplastic material on the contacting surface of the display panel, preceding the placement of the display panel and the backlight into contact on the common contact area; and applying a heat flow in the common contact area to create a local weld connection in the common contact area between the display panel and the backlight.

17. A method according to claim 16, wherein the heat flow is applied by placing a resistive wire between the contacting surface of the display panel and the contacting surface of the backlight and by passing an electric current through the resistive wire.

18. A LCD display module, comprising:
a display panel;
a backlight, wherein the display panel and the backlight are placed into contact on a common contact area, the common contact area being defined as a fixation region of a contacting surface of the display panel coinciding with a contacting surface of the backlight, wherein the contacting surface of the backlight consists of a thermoplastic material and the contacting surface of the display panel consists of a material other than the thermoplastic and incompatible for welding to the thermoplastic, wherein the method further comprises attaching a layer of a thermoplastic material on the contacting surface of the display panel, preceding the placement of the display panel and the backlight into contact on the common contact area; and
a local weld connection provided in the common contact area between the display panel and the backlight.

19. A LCD display module according to claim 18, wherein the local weld connection is created by applying a heat flow in the common contact area, and further comprising a resistive wire, disposed between the display panel and the backlight, for generating the heat flow when being given an electric current.

20. An electronic device comprising an LCD display module according to claim 18.

21. An electronic device according to claim 20, wherein said LCD display module further comprises:
a resistive wire, disposed between the display panel and the backlight, for generating a heat flow when being given an electric current.

* * * * *